United States Patent
Morikuni

(10) Patent No.: US 8,827,463 B2
(45) Date of Patent: Sep. 9, 2014

(54) PROJECTOR AND ANAMORPHIC PRISM OPTICAL UNIT

(75) Inventor: Eiji Morikuni, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 835 days.

(21) Appl. No.: 13/022,111

(22) Filed: Feb. 7, 2011

(65) Prior Publication Data
US 2011/0199586 A1 Aug. 18, 2011

(30) Foreign Application Priority Data
Feb. 12, 2010 (JP) ................................. 2010-028622

(51) Int. Cl.
*G03B 21/28* (2006.01)
*G03B 21/14* (2006.01)

(52) U.S. Cl.
CPC ...................................... *G03B 21/14* (2013.01)
USPC ................ 353/81; 353/76; 353/101; 359/669

(58) Field of Classification Search
CPC ........ G02B 13/10; G02B 26/08; G02B 13/08; G02B 13/12; G03B 21/14
USPC ................. 353/76, 81, 101; 359/669
See application file for complete search history.

(56) References Cited

U.S. PATENT DOCUMENTS

| 3,045,542 | A | * | 7/1962 | Finkelstein | 352/69 |
| 3,168,609 | A | * | 2/1965 | Newcomer | 359/669 |
| 3,551,029 | A | * | 12/1970 | Kirchhoff | 359/669 |
| 3,637,308 | A | * | 1/1972 | Van Raalte et al. | 353/69 |
| 3,751,136 | A | * | 8/1973 | Kirchhoff | 359/669 |
| 3,774,990 | A | * | 11/1973 | Beck et al. | 359/669 |
| 4,017,160 | A | | 4/1977 | Betensky | |
| 6,678,095 | B2 | * | 1/2004 | Kelly | 359/669 |
| 2001/0053033 | A1 | * | 12/2001 | Bolt | 359/831 |

* cited by examiner

Primary Examiner — Georgia Y Epps
Assistant Examiner — Kevin Wyatt
(74) Attorney, Agent, or Firm — Oliff PLC

(57) ABSTRACT

A projector includes an anamorphic prism optical system for converting an aspect ratio of an irradiation region on which the video light is irradiated. The anamorphic prism optical system includes a first prism set and a second prism set. The first prism set is obtained by combining a first prism and a second prism, and the second prism set is obtained by combining a third prism and a fourth prism. The first prism, the second prism, the third prism, and the fourth prism are respectively rotatable around rotation axes thereof, and a space between the first and second prism sets is adjustable in association with the rotation of the first prism, the second prism, the third prism, and the fourth prism.

18 Claims, 14 Drawing Sheets

PROJECTOR AND ANAMORPHIC PRISM OPTICAL UNIT

BACKGROUND

1. Technical Field

The present invention relates to a projector and an anamorphic prism optical unit, and, more particularly to a projector including an anamorphic prism optical system for converting an aspect ratio of an irradiation region.

2. Related Art

A projector modulates light using a spatial light modulating device having fixed size. On the other hand, in some case, input signals having various aspect ratios (vertical to horizontal ratios) are input to the projector. As measures against a problem in that aspect ratios are different between the spatial light modulating device and an image signal, in general, luminance in an image blank region (a blank section) caused by the difference between the aspect ratios is set to a minimum value. In other words, "black" is always displayed in the image blank region. However, if an image is displayed only in a section other than the blank section, a drop in resolution and a drop in light use efficiency are caused. Therefore, it is desired to solve the problem with other measures.

As a method for solving the problem, there is known a method of, after expanding the image to the image blank region of the spatial light modulating device and modulating the light, restoring the image to the original aspect ratio defined by the image signal. For conversion of an aspect ratio, for example, an anamorphic lens of a front converter type attached in front of a projection lens (on a surface to be irradiated side) is used. In this case, the conversion of an aspect ratio is performed according to only a peculiar magnification set in the front converter. Therefore, for example, when image signals of various standards (Cinema Scope, European Vista, American Vista, Standard, etc.) having relatively small aspect ratio differences are input as in movies, it is difficult to accurately apply the respective standards. To deal with this problem, for example, U.S. Pat. No. 4,017,160 proposes a technique for respectively rotating and displacing two prism sets provided in an optical path to thereby make it possible to continuously change and set an aspect ratio.

In the technique proposed in U.S. Pat. No. 4,017,160, a configuration in which two kinds of glass materials are bonded to each other is adopted as each of the prism sets, whereby a reduction in color aberration is realized. However, whereas such a configuration can satisfy conditions for color aberration reduction when rotation amounts of prisms are in a specific relation with each other, in some case the conditions for the color aberration reduction are not satisfied when the relation is changed according to the rotation of the prism sets.

SUMMARY

An advantage of some aspects of the invention is to provide a projector and an anamorphic prism optical unit that continuously change an aspect ratio to enable application to various standards having different aspect ratios and enable a reduction in color aberration.

According to an aspect of the invention, a projector includes: a projection optical system that projects video light; and an anamorphic prism optical system for converting an aspect ratio of an irradiation region on which the video light is irradiated. The anamorphic prism optical system includes: a first prism set obtained by combining a first prism and a second prism on which the video light emitted from the first prism is made incident; and a second prism set obtained by combining a third prism on which the video light emitted from the second prism is made incident and a fourth prism on which the video light emitted from the third prism is made incident. The first prism, the second prism, the third prism, and the fourth prism are respectively rotatable around the rotation axes thereof. A space between the first and second prism sets is adjustable in association with the rotation of the first prism, the second prism, the third prism, and the fourth prism.

Each of the first and second prism sets is configured by combining a prism having a main function of changing light beam width (e.g., the first prism or the fourth prism) and a prism having a main function of reducing color aberration (e.g., the second prism or the third prism). The anamorphic prism optical system gradually rotates the prism for changing light beam width to continuously change an aspect ratio. The anamorphic prism optical system adjusts the tilt of the prism for color aberration reduction with respect to the prism for changing light beam width and adjusts the space between the first and second prism sets according to the rotation of the prisms. It is possible to perform adjustment for satisfying conditions for reducing color aberration, irrespective of the aspect ratio after conversion, according to the adjustment of rotation amounts of the prisms constituting the prism set and the adjustment of the space between the prism sets. This makes it possible to change the aspect ratio continuously and suppress color aberrations concerning respective colors irrespective of the aspect ratio after conversion.

The projector may include: a first rotation supporting section that rotatably supports the first and second prisms; and a second rotation supporting section that rotatably supports the third and fourth prisms. This makes it possible to hold the prisms constituting the prism set to fix a distance between the rotation axes of the prisms and adjust rotation amounts of the prisms independently from each other.

The projector may include: a first prism rotation control mechanism for control of a rotation amount for rotating the first prism and a rotation amount for rotating the second prism in association with the first prism; and a second prism rotation control mechanism for control of a rotation amount for rotating the fourth prism and a rotation amount for rotating the third prism in association with the fourth prism. This makes it possible to adjust the rotation amounts of the prisms constituting the prism set to correspond to the conversion of the aspect ratio.

The projector may include a prism set space adjusting mechanism for adjusting the space between the first and second prism set by moving the first prism set in association with the rotation of the first and second prisms and moving the second prism set in association with the rotation of the third and fourth prisms. This makes it possible to adjust the space between the prism sets to correspond to the conversion of the aspect ratio.

The projector may include: a first cam movable section movable with respect to the first rotation supporting section and configuring the first prism rotation control mechanism; a second cam movable section movable with respect to the second rotation supporting section and configuring the second prism rotation control mechanism; and a cam convex section attached to the first prism, a cam convex section attached to the second prism, a cam convex section attached to the third prism, and a cam convex section attached to the fourth prism. The first cam movable section may include: a first cam receiving section formed to be capable of sliding the cam convex section attached to the first prism; and a second cam receiving section formed to be capable of sliding the cam convex section attached to the second prism. The second cam movable section may include: a first cam receiving section formed to be capable of sliding the cam convex section attached to the fourth prism; and a second cam receiving section formed to be capable of sliding the cam convex section attached to the third prism. The first cam movable section and the second cam movable section are moved such that the cam convex sections slide in the first and second cam receiving sections. The rotation amounts of the prisms can be controlled according to the shape of the first and second cam receiving sections.

The first and second cam movable sections may configure the prism set space adjusting mechanism. This makes it possible to control the space between the prism sets to correspond to the rotation amounts of the prisms.

The projector may include an operation section for simultaneously moving the first and second cam movable sections. This makes it possible to collectively control the rotation amounts of the prisms and the space between the prism sets according to the operation of the operation section.

The first and second prisms may be formed of members having refractive indexes different from each other. The third and fourth prisms may be formed of members having refractive indexes different from each other. This makes it possible to realize high-performance aspect ratio conversion with color aberration reduced.

The second prism may be formed of the member having a refractive index higher than that of the member forming the first prism. The third prism may be formed of the member having a refractive index higher than that of the member forming the fourth prism. The rotation amounts of the prisms are adjusted such that a rotation amount of the second and third prisms formed of the higher-refractive index member is smaller than a rotation amount of the first and fourth prisms formed of the lower-refractive index member. Since the rotation amounts of the second and third prisms arranged between the first and fourth prisms can be set small, it is possible to suppress contact of the first and second prisms and contact of the fourth and third prisms.

The first and fourth prisms may be formed of a same material, and the second and third prisms may be formed of a same material. A shape of the first prism may have an apical angle in a predetermined plane, a shape of the second prism may have an apical angle in a predetermined plane, a shape of the third prism may have an apical angle in a predetermined plane, and a shape of the fourth prism may have an apical angle in a predetermined plane. The apical angle of the shape of the first prism may be the same as the apical angle of the shape of the fourth prism, and the apical angle of the shape of the second prism may be the same as the apical angle of the shape of the third prism. This makes it possible to suppress processing cost and material cost.

The shape of the first prism may be the same as the shape of the fourth prism, and the shape of the second prism may be the same as the shape of the third prism. Consequently, there are only two kinds of prisms processed to form the first and second prism sets. This makes it possible to further suppress the processing cost.

An angle formed by the normal of an incident surface of the first prism on which the video light is made incident and an incident ray may be equal to an absolute value of an angle formed by the normal of an incident surface of the fourth prism on which the video light is made incident and the incident ray. An angle formed by the normal of an incident surface of the second prism on which the video light is made incident and an incident ray is equal to an absolute value of an angle formed by the normal of an incident surface of the third prism on which the video light is made incident and the incident ray. The anamorphic prism optical system makes the direction of an incident ray and the direction of an emitted ray parallel and emits a light beam, which is made incident as collimate light, as the collimate light. This makes it possible to realize high-performance aspect ratio conversion with an aberration reduced.

The anamorphic prism optical system may be provided in a position where the video light emitted from the projection optical system is made incident. In a light beam at each image height emitted from the projection optical system, a center ray (a principal ray) and peripheral rays of the light beam are substantially parallel to each other. Therefore, even if the video light from the projection optical system is made incident on the anamorphic prism optical system, a large angle error is not caused and a satisfactory video can be obtained. When the anamorphic prism optical system is attached on the emission side of the projection optical system, it is possible to convert an aspect ratio of a video while maintaining the optical performance of the projection optical system. It is possible to easily realize aspect conversion simply by attaching the anamorphic prism optical system on a surface to be irradiated side of a general projection optical system.

The anamorphic prism optical system may be arranged between optical elements constituting the projection optical system. The anamorphic prism optical system is arranged in a position where a principal ray and peripheral rays of a light beam are substantially parallel to each other. The anamorphic prism optical system can be arranged in a position before a ray is widely diffused in an optical path. The anamorphic prism optical system and the projection optical system can be integrated. Therefore, it is possible to reduce the size of the optical system.

The anamorphic prism optical system may be arranged in the vicinity of a stop of the projection optical system. This makes it possible to arrange the anamorphic prism optical system in the position where the principal ray and the peripheral rays of the light beam are substantially parallel to each other.

The projector may include: a first optical system that makes the video light converted into collimate light incident on the anamorphic prism optical system; and a second optical system that makes the video light emitted from the anamorphic prism optical system incident on the projection optical system. The second optical system may image an intermediate image. A relay optical system functions as a double-sided telecentric optical system that can convert an aspect ratio. This makes it possible to continuously change an aspect ratio of the intermediate image. Since back-focus of the projection optical system after the intermediate image can be theoretically reduced to zero, it is possible to realize improvement of performance and a reduction in size of the projection optical system.

The projection optical system may be movable in a direction in which light beam width is changed according to conversion of the aspect ratio. The projection optical system is moved to offset movement of the irradiation region involved in the conversion of the aspect ratio. This makes it possible to realize an optical system in which the position of the irradiation region is fixed even if the aspect ratio is converted.

According to another aspect of the invention, an anamorphic prism optical system for converting an aspect ratio of an irradiation region on which a video light is irradiated, the anamorphic prism optical system including: a first prism set obtained by combining a first prism and a second prism on which the video light emitted from the first prism is made incident; and a second prism set obtained by combining a third prism on which the video light emitted from the second prism is made incident and a fourth prism on which the video light emitted from the third prism is made incident. The first prism, the second prism, the third prism, and the fourth prism are respectively rotatable around the rotation axes thereof. A space between the first and second prism sets is adjustable in association with the rotation of the first prism, the second prism, the third prism, and the fourth prism. This makes it possible to continuously change the aspect ratio and suppress color aberrations concerning respective colors irrespective of the aspect ratio after conversion.

BRIEF DESCRIPTION OF THE DRAWINGS

The invention will be described with reference to the accompanying drawings, wherein like numbers reference like elements.

FIG. 2 is a diagram showing a projection optical system, an anamorphic prism optical system, and the like.

DESCRIPTION OF EXEMPLARY EMBODIMENTS

Embodiments of the invention are explained in detail below with reference to the accompanying drawings.

First Embodiment

Figure 1:
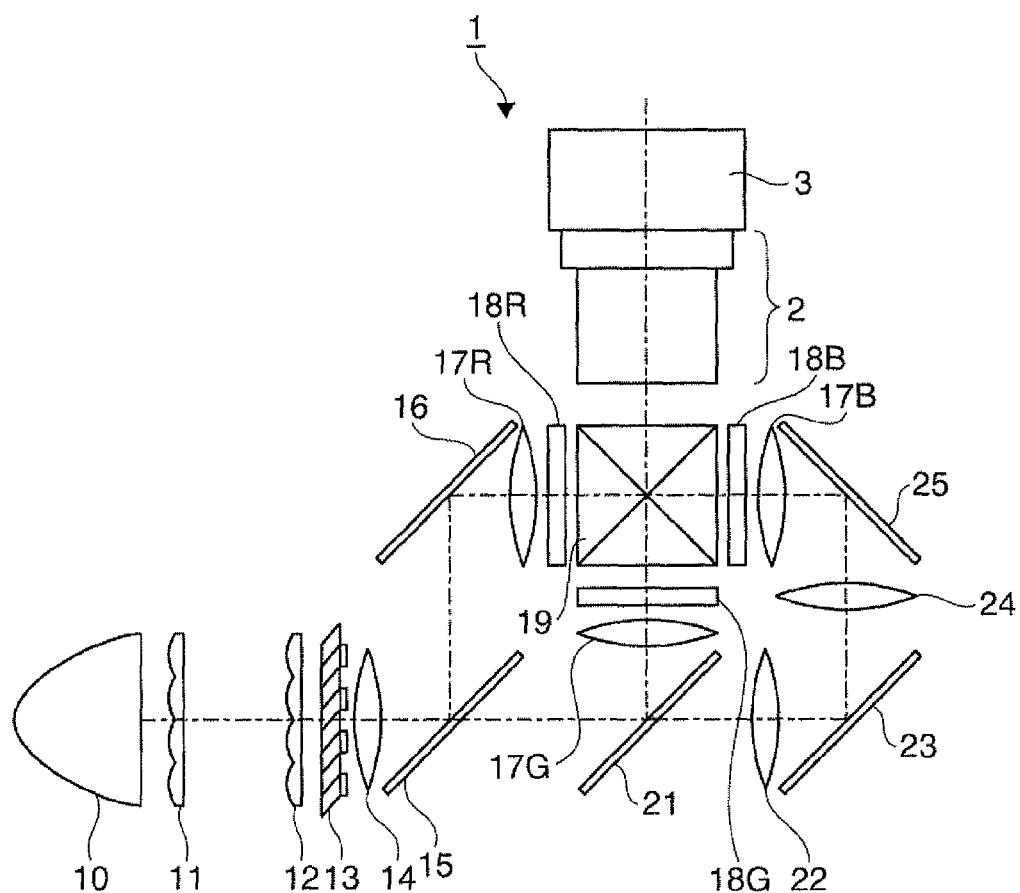
FIG. 1 is a diagram showing a schematic configuration of a projector according to a first embodiment.

FIG. 1 is a diagram showing a schematic configuration of a projector 1 according to a first embodiment of the invention. A light source 10 is, for example, a high-pressure mercury lamp. The light source 10 emits illumination light including red (R) light, green (G) light, and blue (B) light. The light source 10 may be a semiconductor light source or the like other than the high-pressure mercury lamp. A first integrator lens 11 and a second integrator lens 12 include plural lens elements arranged in an array shape. The first integrator lens 11 divides a light beam from the light source 10 into plural light beams. The lens elements of the first integrator lens 11 condense the light beam from the light source 10 in the vicinity of the lens elements of the second integrator lens 12. The lens elements of the second integrator lens 12 form images of the lens elements of the first integrator lens 11 on liquid crystal display panels 18R, 18G, and 18B.

A polarization conversion element 13 converts the light from the second integrator lens 12 into predetermined linear polarized light. A superimposing lens 14 superimposes the images of the lens elements of the first integrator lens 11 on irradiation surfaces of the liquid crystal display panels 18R, 18G, and 18B. A first dichroic mirror 15 reflects the R light made incident from the superimposing lens 14 and transmits the G light and the B light. The R light reflected on the first dichroic mirror 15 is made incident on the liquid crystal display panel 18R as a spatial light converting device through a reflection mirror 16 and a field lens 17R. The liquid crystal display panel 18R modulates the R light according to an image signal.

The second dichroic mirror 21 reflects the G light from the first dichroic mirror 15 and transmits the B light. The G light reflected on the second dichroic mirror 21 is made incident on the liquid crystal display panel 18G as a spatial light modulating device through a field lens 17G. The liquid crystal display panel 18G modulates the G light according to the image signal. The B light transmitted through the second dichroic mirror 21 is made incident on the liquid crystal display panel 18B as a spatial light modulating device through relay lenses 22 and 24, reflection mirrors 23 and 25, and a field lens 17B. The liquid crystal display panel 18B modulates the B light according to the image signal. A cross-dichroic prism 19 as a color combining optical system combines the lights modulated by the liquid crystal display panels 18R, 18G, and 18B into video light and passes the video light to the projection optical system 2.

The projection optical system 2 projects the video light from the cross-dichroic prism 19. The anamorphic prism optical system 3 is provided in a position where the video light emitted from the projection optical system 2 is made incident. The anamorphic prism optical system (an anamorphic prism optical unit) 3 converts an aspect ratio of an irradiation region on which the video light is irradiated. The projector 1 makes the video light emitted from the anamorphic prism optical system 3 incident on a surface to be irradiated of a screen or the like. As the spatial light modulating device, liquid crystal display panels of a reflection type, devices of a reflection type (e.g., micro-mirror devices), or the like may be adopted instead of the liquid crystal display panels 18R, 18G, and 18B of a transmission type.

Figure 2:
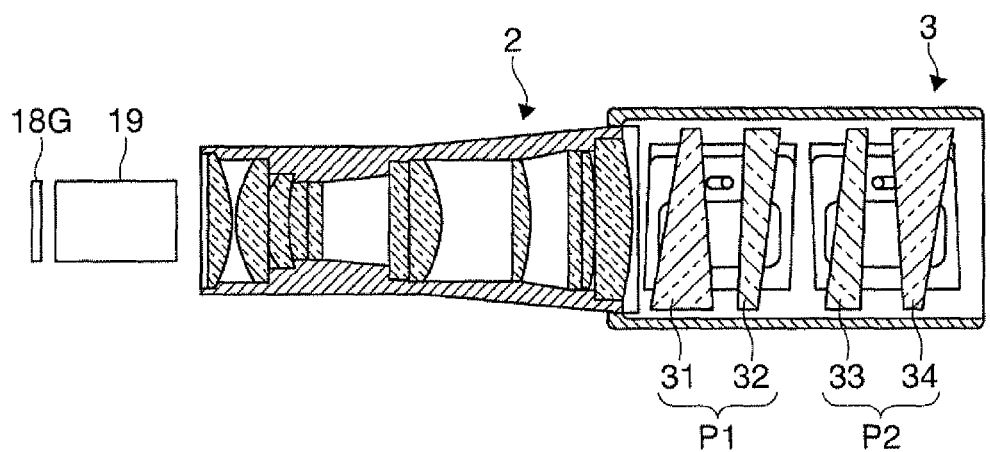

FIG. 2 is a diagram showing the liquid crystal display panel 18G, the cross-dichroic prism 19, the projection optical system 2, and the anamorphic prism optical system 3 in the projector 1. In the figure, the projection optical system 2 is represented by a section, and the anamorphic prism optical system 3 is represented by a section. The anamorphic prism optical system 3 includes a first prism 31, a second prism 32, a third prism 33, and a fourth prism 34.

The video light traveled from the projection optical system 2 to the anamorphic prism optical system 3 is made incident on the first prism 31. The video light emitted from the first prism 31 is made incident on the second prism 32. The combination of the first and second prisms 31 and 32 constitutes a first prism set P1. The video light emitted from the second prism 32 is made incident on the third prism 33. The video light emitted from the third prism 33 is made incident on the fourth prism 34. The combination of the third and fourth prisms 33 and 34 constitutes a second prism set P2.

Figure 3:
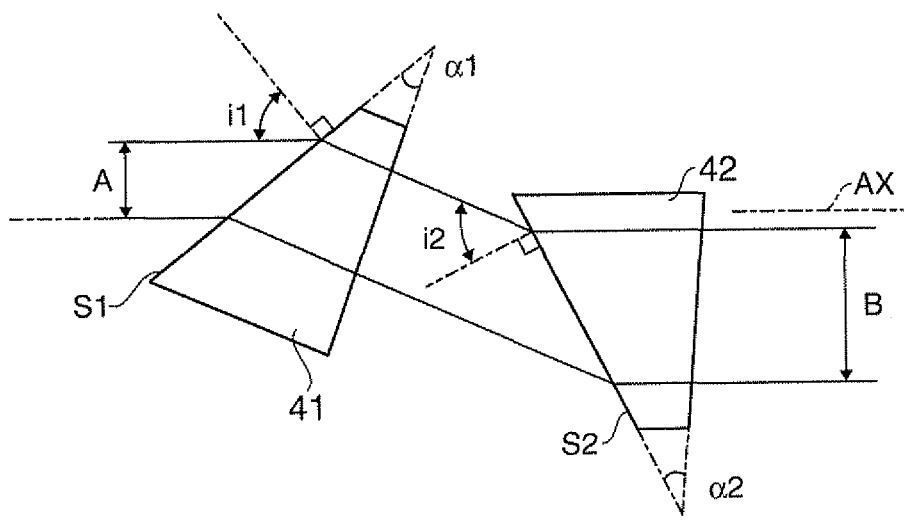
FIG. 3 is a diagram showing a basic configuration of a general anamorphic prism optical system.

Before the explanation of a characteristic configuration of the anamorphic prism optical system 3, a basic technique of the anamorphic prism optical system 3 is explained. A basic configuration of a general anamorphic prism optical system is shown in FIG. 3. The general anamorphic prism optical system includes two prisms 41 and 42, apical angles of which are equal ($\alpha1=\alpha2$). The two prisms 41 and 42 are arranged to face opposite directions. The prisms 41 and 42 are respectively rotatably supported with axes in a predetermined direction (e.g., a direction perpendicular to the paper surface of the figure) set as rotation axes. The rotation axes of the prisms 41 and 42 are perpendicular to a predetermined plane parallel to a direction in which the width of a light beam is changed (the up-down direction in the figure) and an optical axis AX of an optical system (e.g., the projection optical system 2). The predetermined plane parallel to the direction in which the width of the light beam is changed and parallel to the optical axis AX is hereinafter referred to as "reference plane" as appropriate.

On the reference plane, an angle formed by the normal of an incident surface S1 of the prism 41 and an incident ray on the incident surface S1 is represented as i1 and an angle formed by the normal of an incident surface S2 of the prism 42 and an incident ray on the incident surface S2 is represented as i2. Rotation amounts of the two prisms 41 and 42 are adjusted such that absolute values of the angles i1 and i2 are equal to each other and signs thereof are opposite to each other ($-i1=i2$). Consequently, a principal ray of a light beam made incident on the prism 41 and a principal ray of a light beam emitted from the prism 42 are made parallel to each other. The rotation amounts of the prisms 41 and are adjusted while the relation explained above is kept concerning the angles i1 and i2, whereby a scaling ratio of width B of a light beam emitted from the anamorphic prism optical system to width A of a light beam made incident on the anamorphic prism optical system is adjusted.

Figure 4:
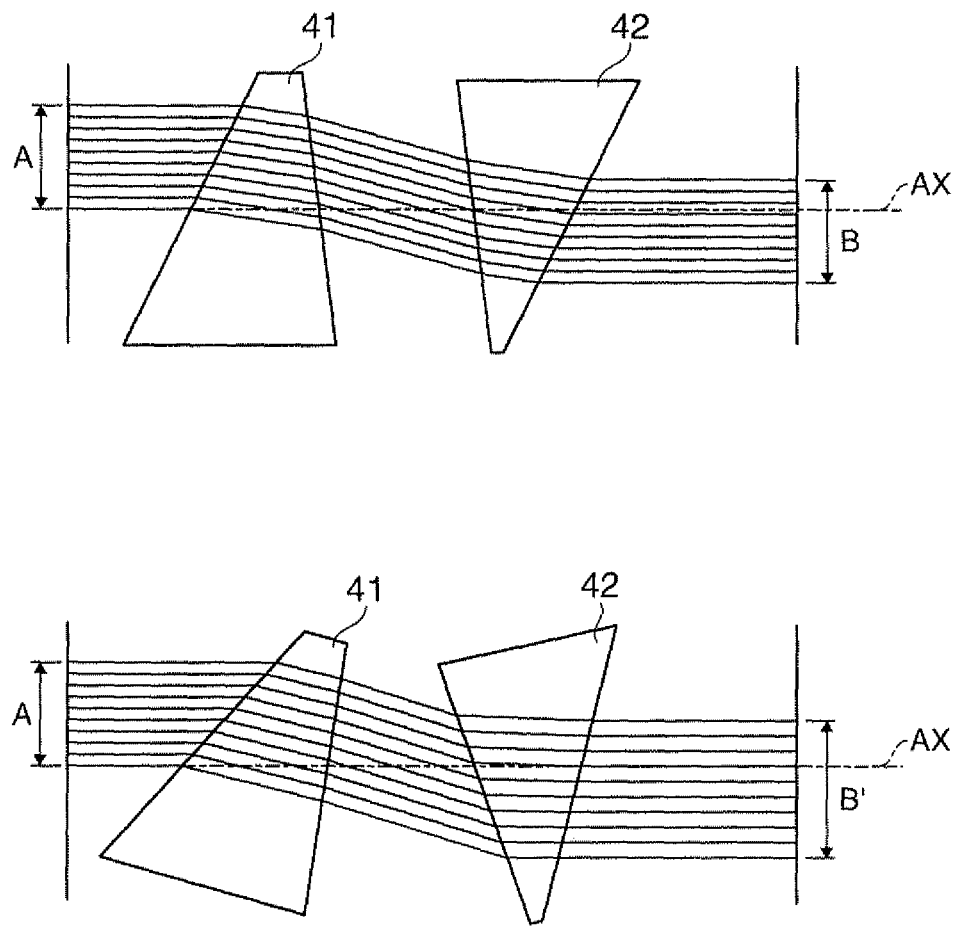
FIG. 4 is a diagram showing an example in which the width of a light beam is adjusted by the anamorphic prism optical system.

FIG. 4 is a diagram showing an example in which the width of a light beam is adjusted by the anamorphic prism optical system. An example of adjustment at a magnification of 1.0 is shown in the upper part of FIG. 4. An example of adjustment at a magnification of 1.33 is shown in the lower part of FIG. 4. When the magnification is 1.0, the width of the light beam is kept at the time of incidence on the prism 41 and at the time of emission from the prism 42 (A=B). When the magnification is 1.33, the prism 41 is rotated clockwise and the prism 42 is rotated counterclockwise from the respective positions of the prisms 41 and 42 at the time when the magnification is 1.0. The width of the light beam is expanded to 1.33 times as large as the width by rotating the prisms 41 and 42 in this way (B'=1.33A).

Such an anamorphic prism optical system is used for, for example, beam shaping of a semiconductor laser. When the anamorphic prism optical system is applied to an imaging system as in this embodiment, substantially parallel rays need to be made incident on the prism 41 to obtain parallel rays having a converted aspect ratio. The relations shown in FIGS. 3 and 4 are relations for explaining single-color light. When plural color lights in a wide wavelength range are made incident, occurrence of color aberration poses a problem.

Figure 5:
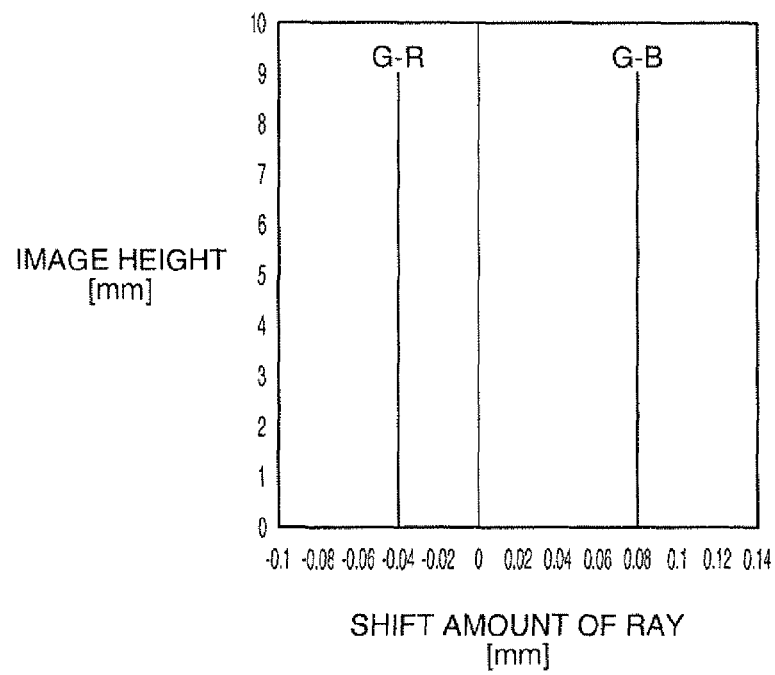
FIG. 5 is a graph representing a relation between image height and color aberration at a magnification of 1.0.
Figure 6:
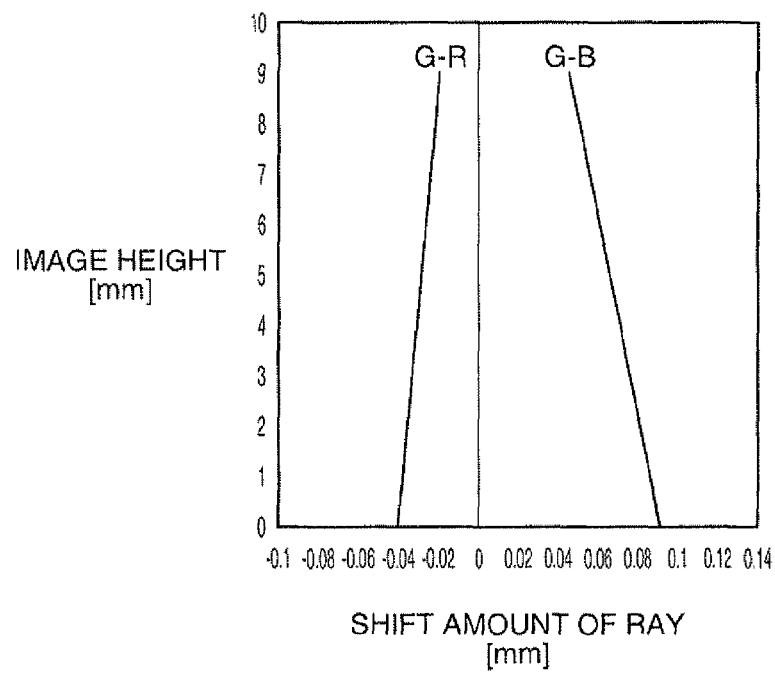
FIG. 6 is a graph representing a relation between image height and color aberration at a magnification of 1.33.

FIGS. 5 and 6 are graphs representing relations between image height and color aberration of the anamorphic prism optical system shown in FIG. 4. FIG. 5 represents a relation between image height and color aberration at a magnification of 1.0. FIG. 6 represents a relation between image height and color aberration at a magnification of 1.33. In FIGS. 5 and 6, the vertical axis represents image height, and the horizontal axis represents shift amount of ray in an emission surface of the prism 41. The image height means the height of an image with reference to the optical axis AX. In the figure, a straight line "G-R" represents color aberration caused with respect to the R light when the G light is set as a reference. A straight line "G-B" in the figure represents color aberration caused with respect to the B light when the G light is set as a reference.

Color aberrations in which rays shift about 20 μm to 100 μm occur at all image heights at both the case of a magnification of 1.0 shown in FIG. 5 and the case of a magnification of 1.33 shown in FIG. 6. For example, a maximum shift equivalent to ten or more pixels occurs depending on a color in the liquid crystal display panels 18R, 18G, and 18B in which one pixel has the size of about 8.5 μm to 12 μm. To deal such color aberrations, for example, U.S. Pat. No. 4,017,160 proposes to bond prisms having different refractive indexes to each of the prisms constituting the anamorphic prism optical system.

Figure 7:
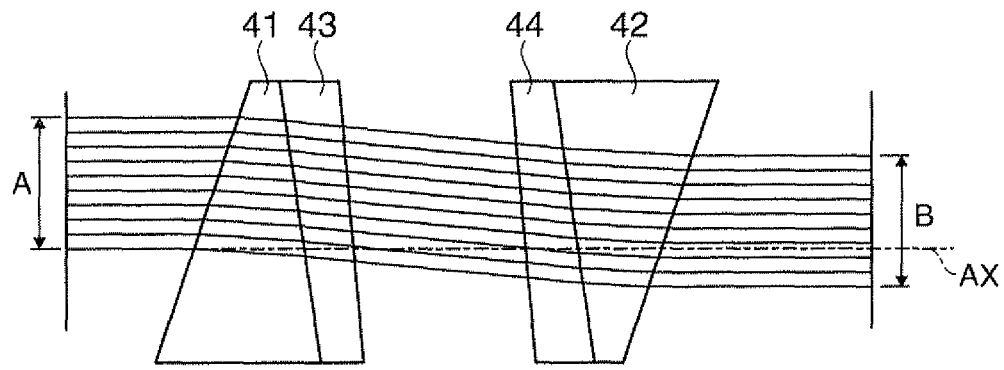
FIG. 7 is a diagram showing an example in which prisms for color aberration reduction is bonded to each other.
Figure 8:
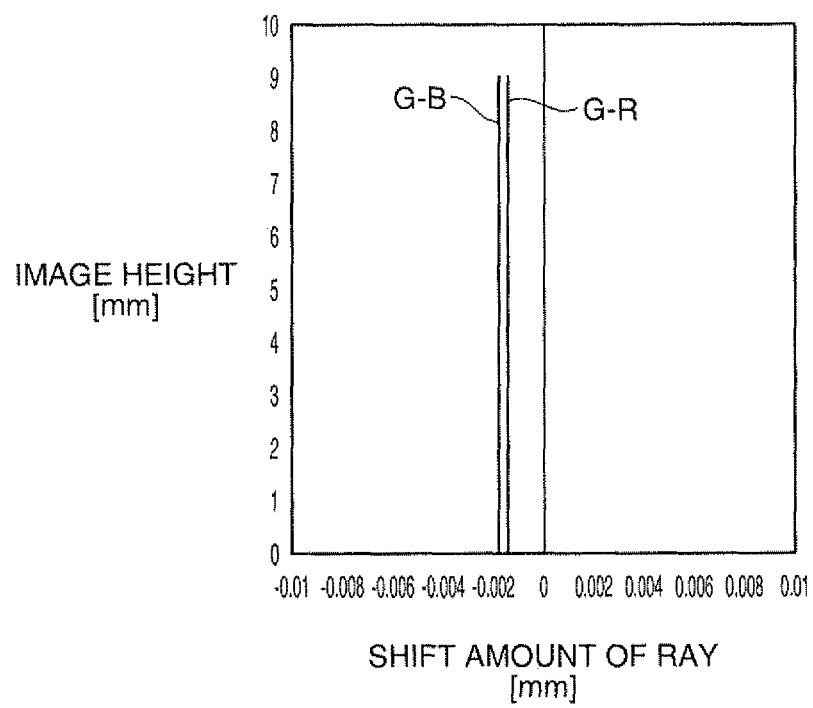
FIG. 8 is a graph representing a relation between image height and color aberration in the example shown in FIG. 7.

FIG. 7 is a diagram showing an example in which the prisms 43 and 44 are respectively bonded to the prisms 41 and 42 shown in FIG. 4 to reduce color aberration. FIG. 8 is a graph representing a relation between image height and color aberration in the example shown in FIG. 7. A state at a magnification of 1.0 is shown in the figures. The prisms 43 and 44 for the color aberration reduction are bonded to an emission surface of the prism 41 on an incident side for magnification conversion and an incident surface of the prism 42 on an emission side. The prisms 43 and 44 for the color aberration reduction are formed in shapes having apical angles equal to each other. As a glass material forming the prisms 41 and 42 for the magnification conversion, for example, S-FPL51 is used. As a glass material forming the prisms 43 and 44 for the color aberration reduction, for example, S-TIH53 is used.

The prisms 41 and 43 are rotatably supported around a common rotation axis. The prisms 42 and 44 are rotatably supported around a common rotation axis. As shown in FIG. 8, in the case of the magnification of 1.0, a shift of a ray due to color aberration is equal to or smaller than 2 μm at all image heights. In this case, the color aberration is suppressed to a degree sufficiently permissible in practice.

Figure 9:
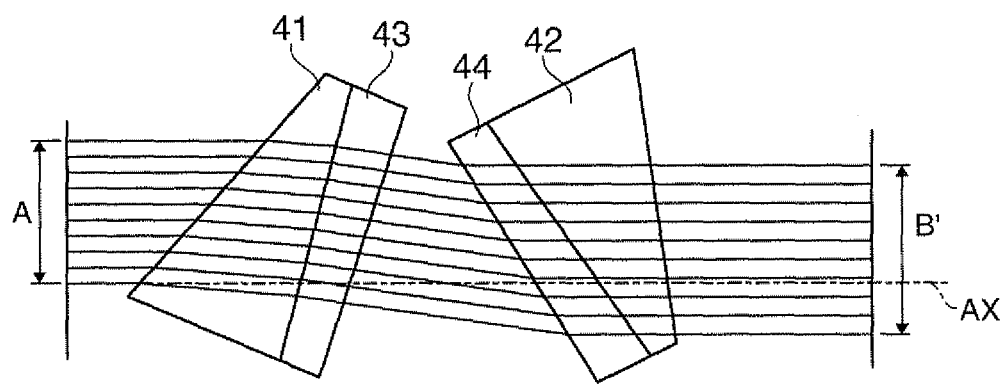
FIG. 9 is a diagram showing a state in which two pairs of prisms are rotated to set a magnification to 1.30.
Figure 10:
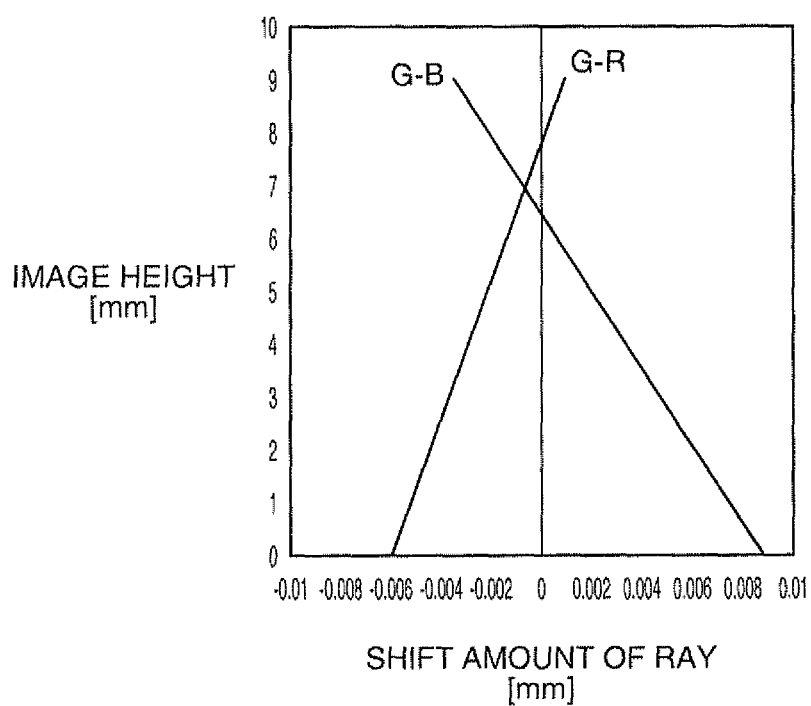
FIG. 10 is a graph representing a relation between age height and color aberration in an example shown in FIG. 9.

FIG. 9 is a diagram showing a state in which two pairs of prisms are rotated from the state shown in FIG. 7 to set a magnification to 1.30. FIG. 10 is a graph representing a relation between image height and color aberration in an example shown in FIG. 9. The front two prisms 41 and 43 bonded to each other are rotated clockwise from the state shown in FIG. 7. The rear two prisms 42 and 44 bonded to each other are rotated counterclockwise from the state shown in FIG. 7. As shown in FIG. 10, in the case of the magnification of 1.30, a shift of a ray due to color aberration increases to about 8 µm at the maximum. When rotation amounts of the prisms are changed from those in the configuration shown in FIG. 7, in some case, conditions for the color aberration reduction are not satisfied.

Figure 11:
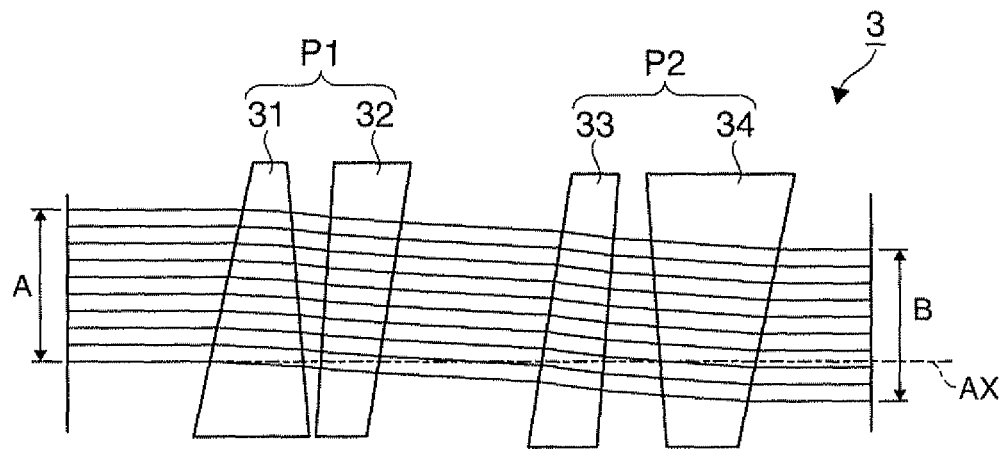
FIG. 11 is a diagram for explaining an anamorphic prism optical system according to the first embodiment.

FIG. 11 is a diagram for explaining the first and second prism sets P1 and P2 constituting the anamorphic prism optical system 3 according to this embodiment. A state in which a magnification is set to 1.0 is shown in the figure. The first and fourth prisms 31 and 34 have a main function of changing light beam width. The first and fourth prisms 31 and 34 are formed in shapes having the same apical angle in the reference plane. The first and fourth prisms 31 and 34 are arranged with the directions thereof set 180 degrees different from each other in the state of the magnification of 1.0. The first and fourth prisms 31 and 34 are formed of the same glass material, for example, S-FPL51 as low dispersion glass.

The second and third prisms 32 and 33 have a main function of reducing color aberration. The second and third prisms 32 and 33 are formed in shapes having the same apical angle in the reference plane. The second and third prisms 32 and 33 are arranged with the directions thereof set 180 degrees different from each other in the state of the magnification of 1.0. The second and third prisms 32 and 33 are formed of a member having a refractive index higher than that of the first and fourth prisms 31 and 34. The second and third prisms 32 and 33 are formed of the same glass material, for example, S-TIH53 as high-refractive index glass.

The first and fourth prisms 31 and 34 and the second and third prisms 32 and 33 are respectively formed of the same members and respectively have the same apical angles. Therefore, it is possible to suppress processing cost and material cost. Further, in the anamorphic prism optical system 3, it is desirable that the first and fourth prisms 31 and 34 have the same shape each other and the second and third prisms 32 and 33 have the same shape each other. Consequently, there are only two kinds of prisms processed to constitute the first and second prism sets P1 and P2. Therefore, it is possible to further suppress the processing cost.

The first prism 31, the second prism 32, the third prism 33, and the fourth prism 34 are rotatably supported around the rotation axes thereof perpendicular to the reference plane. Rotation amounts of the prisms 31, 32, 33, and 34 are respectively adjusted by operations independent from one another. As in the case of the basic configuration shown in FIG. 3, rotation amounts of the first and fourth prisms 31 and 34 are adjusted such that absolute values of angles formed by the normals of the incident surfaces and incident rays are equal to each other and signs thereof are opposite to each other. As in the case of the basic configuration shown in FIG. 3, rotation amounts the second and third prisms 32 and 33 are adjusted such that absolute values of angles formed by the normals of the incident surfaces and incident rays are equal to each other and signs thereof are opposite to each other.

Consequently, a principal ray of a light beam made incident on the first prism 31 and a principal ray of a light beam emitted from the fourth prism 34 are made parallel to each other. The rotation amounts of the prisms 31, 32, 33, and 34 are adjusted while the relation among the prisms is kept, whereby a scaling ratio of width B' of a light beam emitted from the anamorphic prism optical system 3 to width A of a light beam made incident on the anamorphic prism optical system 3 is adjusted. In the anamorphic prism optical system 3, a space between the first and second prism sets P1 and P2 is adjustable in association with the rotation of the first prism 31, the second prism 32, the third prism 33, and the fourth prism 34.

Figure 12:
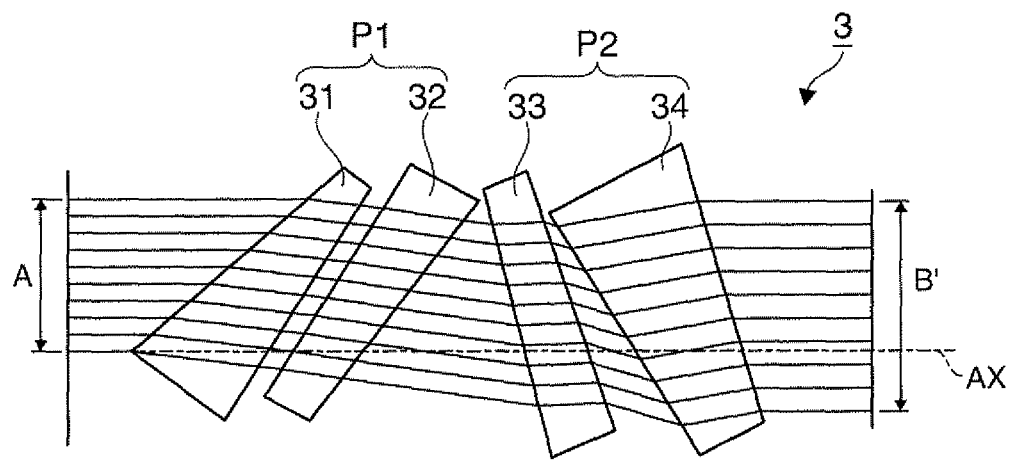
FIG. 12 is a diagram showing a state in which prisms are rotated and moved to set a magnification to 1.30.

FIG. 12 is a diagram showing a state in which the first prism 31, the second prism 32, the third prism 33, and the fourth prism 34 are rotated and moved from the state shown in FIG. 11 and a magnification is set to 1.30. The first and second prisms 31 and 32 are respectively rotated clockwise around the rotation axes thereof from the state shown in FIG. 11. The third and fourth prisms 33 and 34 are respectively rotated counterclockwise around the rotation axes thereof from the state shown in FIG. 11. The space between the second and third prisms 32 and 33, i.e., the space between the first and second prism sets P1 and P2 is narrowed from that in the state shown in FIG. 11.

The rotation amounts of the prisms 31, 32, 33, and 34 are adjusted such that the rotation amounts of the second and third prisms 32 and 33 formed of the higher-refractive index member are small compared with the rotation amounts of the first and fourth prisms 31 and 34 formed of the lower-refractive index member. Since the rotation amounts of the second and third prisms 32 and 33 arranged between the first and fourth prisms 31 and 34 can be set small, it is possible to suppress contact of the first and second prisms 31 and 32 and contact of the fourth and third prisms 34 and 33.

Figure 13:
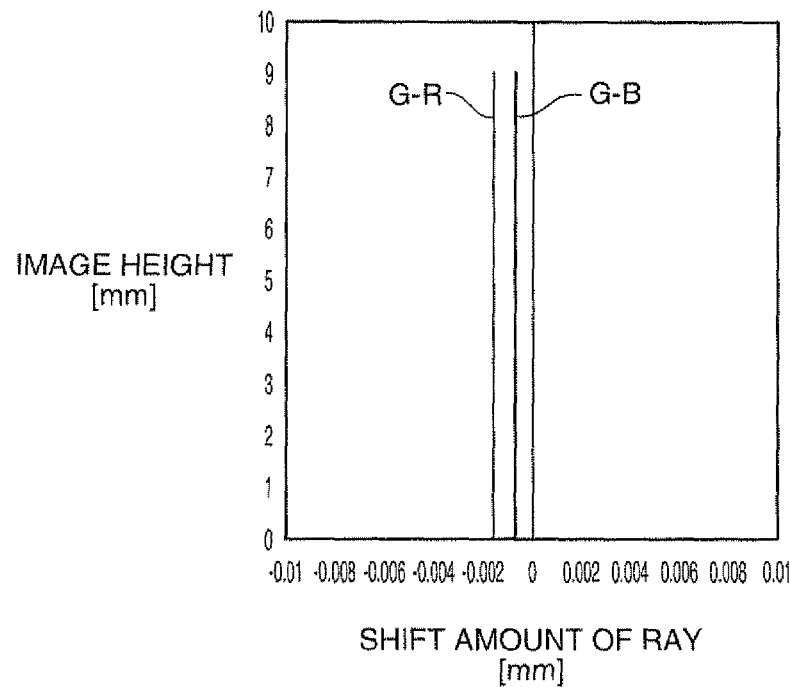
FIG. 13 is a graph representing a relation between image height and color aberration in an example shown in FIG. 11.
Figure 14:
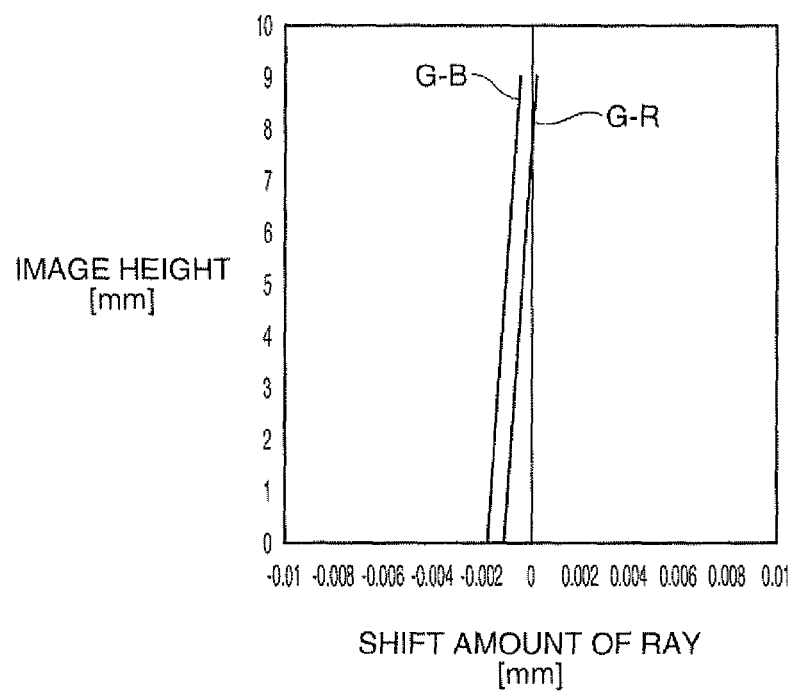
FIG. 14 is a graph representing a relation between image height and color aberration in an example shown in FIG. 12.

FIG. 13 is a graph representing a relation between image height and color aberration in an example shown in FIG. 11. FIG. 14 is a graph representing a relation between image height and color aberration in an example shown in FIG. 12. As shown in FIG. 13, in the case of the magnification of 1.0, a shift of a ray due to color aberration is equal to or smaller than 2 µm at all image heights. As shown in FIG. 14, in the case of the magnification of 1.30, a shift of a ray due to color aberration is also equal to or smaller than 2 µm at all image heights. According to a detailed calculation by the inventor, it was found that a shift of a ray due to color aberration could be reduced to be equal to or smaller than 2 µm for the respective colors in a continuous section between the magnification of 1.0 and the magnification of 1.30.

The anamorphic prism optical system 3 gradually rotates the first and fourth prisms 31 and 34 to continuously change an aspect ratio. The anamorphic prism optical system 3 adjusts a rotation amount of the second prism 32 with respect to the first prism 31 and a rotation amount of the third prism 33 with respect to the fourth prism 34, and the anamorphic prism optical system 3 adjusts the space between the first and second prism sets P1 and P2 according to the rotation of the prisms 31, 32, 33, and 34.

It is possible to perform adjustment for satisfying conditions for reducing color aberration, irrespective of the aspect ratio after conversion, according to the adjustment of the rotation amounts of the first and second prisms 31 and 32 constituting the prism set P1, the adjustment of the rotation amounts of the third and fourth prisms 33 and 34 constituting the second prism set P2, and the adjustment of the space between the first and second prism sets P1 and P2. This makes it possible to continuously change the aspect ratio and suppress color aberrations concerning the respective colors irrespective of the aspect ratio after conversion.

Shapes and members of the prisms 31, 32, 33, and 34 are not limited to those explained this embodiment. For example, the first and fourth prisms 31 and 34 and the second and third prisms 32 and 33 only have to be at least formed of members having different refractive indexes. The first and fourth prisms 31 and 34 are not limited to the same member and the same apical angle. The second and third prisms 32 and 33 are not limited to the same member and the same apical angle. The structures of the prisms 31, 32, 33, and 34 may be changed as appropriate as long as the aspect ratio is continuously changed and color aberration can be suppressed.

Figure 15:
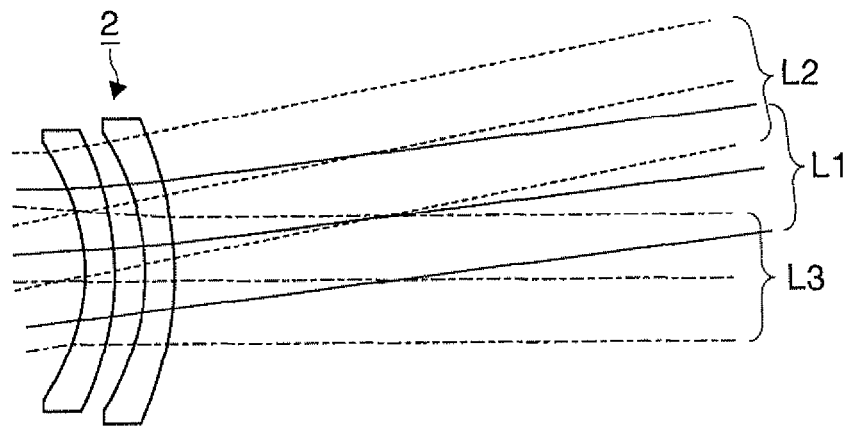
FIG. 15 is a diagram for explaining an incident ray made incident on the anamorphic prism optical system.

FIG. 15 is a diagram for explaining incident rays made incident on the anamorphic prism optical system 3. Rays L1 indicated by solid lines are rays from the same image height. The rays L1 represent a principal ray in the center of a light beam from certain image height and two peripheral rays on the outermost side of the light beam. Rays L2 indicated by broken lines are rays from the same image height and represent a principal ray and two peripheral rays. Rays L3 indicated by alternate long and short dash lines are rays from the same image height and represent a principal ray and two peripheral rays.

The projection optical system 2 emits light (collimate light), a principal ray and peripheral rays of which are substantially parallel, concerning the beam from any of the image heights. It is possible to obtain a satisfactory video image without causing a large angle error by making the collimate light from the projection optical system 2 incident on the anamorphic prism optical system 3. It is possible to convert an aspect ratio of a video while maintaining the optical performance of the projection optical system 2 by attaching the anamorphic prism optical system 3 to the emission side of the projection optical system 2. It is possible to easily realize the aspect ratio conversion simply by attaching the anamorphic prism optical system 3 to the surface to be irradiated side of the general projection optical system 2. The anamorphic prism optical system 3 can be manufactured at low cost because the prisms 31, 32, 33, and 34 can be easily processed compared with a cylindrical lens.

Figure 16:
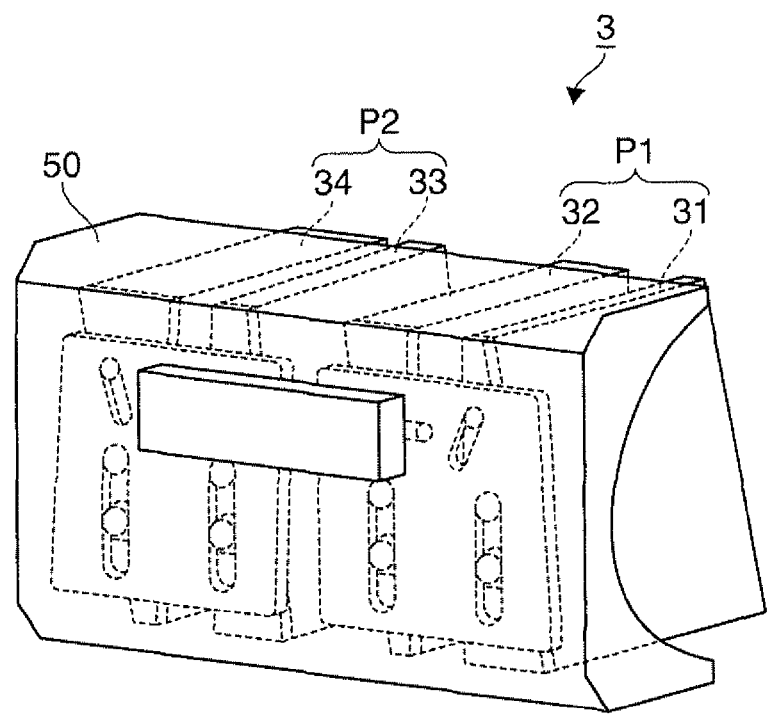
FIG. 16 is a transparent perspective view of the anamorphic prism optical system.

An example of a configuration for controlling the operation of the prisms 31, 32, 33, and 34 is explained below. FIG. 16 is a transparent perspective view of the anamorphic prism optical system 3. The prisms 31, 32, 33, and 34 are stored with the side of upper and lower surfaces and one side surface thereof covered with a case 50.

Figure 17:
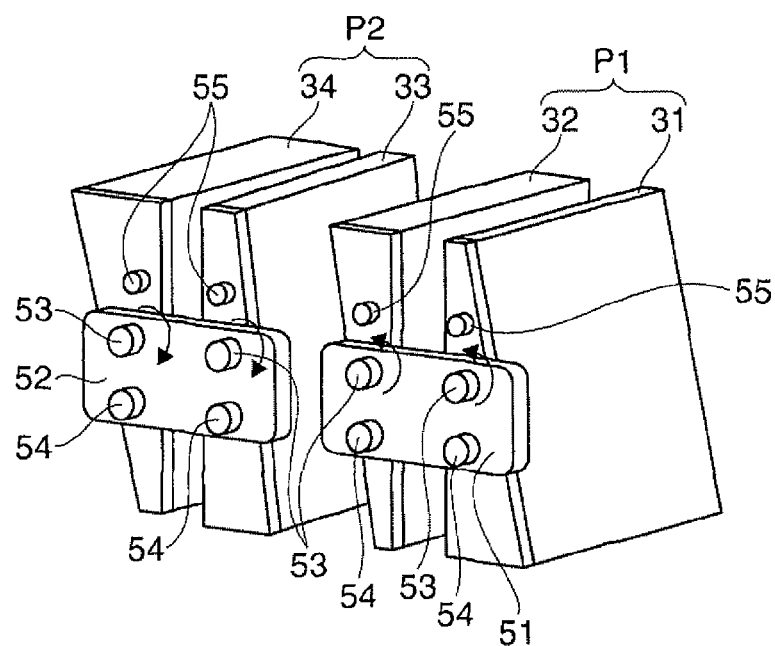
FIG. 17 is a diagram of prisms, a first rotation supporting section, and a second rotation supporting section extracted from the anamorphic prism optical system.

FIG. 17 is a diagram of the prisms 31, 32, 33, and 34, a first rotation supporting section 51, and a second rotation supporting section 52 extracted from the configuration shown in FIG. 16. The first rotation supporting section 51 rotatably supports the first and second prisms 31 and 32. The first and second prisms 31 and 32 are respectively rotatably supported with cam shafts 53, which are attached to the first rotation supporting section 51, set as rotation axes. The first and second prisms 31 and 32 are held such that a distance between the cam shafts 53 is fixed. Rotation amounts of the first and second prisms 31 and 32 can be adjusted independently from each other. Two cam convex sections 54 corresponding to the two cam shafts 53 are formed in the first rotation supporting section 51.

The second rotation supporting section 52 rotatably supports the third and fourth prisms 33 and 34. The third and fourth prisms 33 and 34 are respectively rotatably supported with the cam shafts 53, which are attached to the second rotation supporting section 52, set as rotation axes. The third and fourth prisms 33 and 34 are held such that a distance between the cam shafts 53 is fixed. Rotation amounts of the third and fourth prisms 33 and 34 can be adjusted independently from each other. Two cam convex sections 54 corresponding to the two cam shafts 53 are formed in the second rotation supporting section 52.

Cam convex sections 55 are respectively formed on a side surface on the first rotation supporting section 51 side of the first prism 31, a side surface on the first rotation supporting section 51 side of the second prism 32, a side surface on the second rotation supporting section 52 side of the third prism 33, and a side surface on the second rotation supporting section 52 side of the fourth prism 34. The cam shafts 53, the cam convex sections 54, and the cam convex sections 55 are arranged spaced apart from one another on the side surface sides of the prisms 31, 32, 33, and 34.

Figure 18:
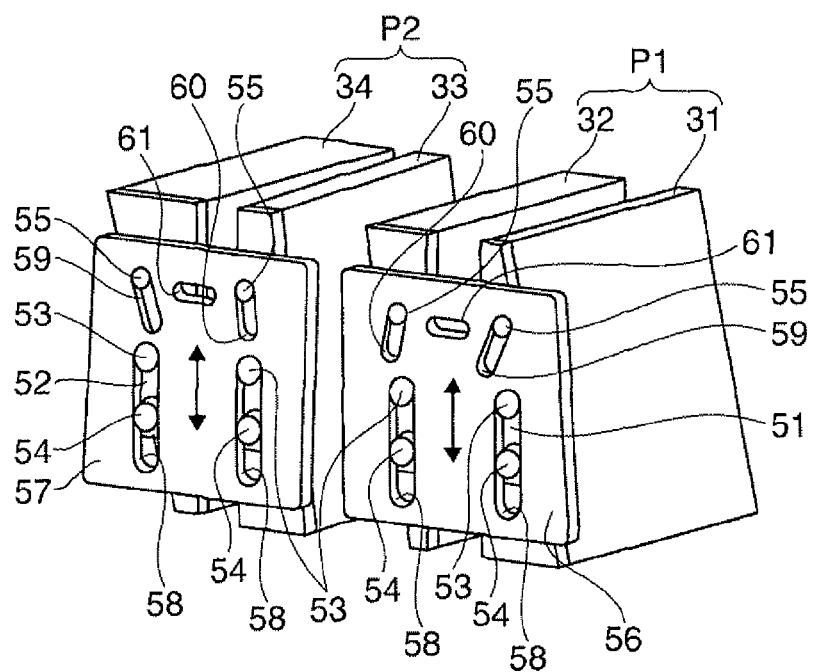
FIG. 18 is a diagram showing a configuration in which a first cam movable section and a second cam movable section are attached.

FIG. 18 is a diagram showing a configuration in which a first cam movable section 56 and a second cam movable section 57 are attached in the configuration shown in FIG. 17. The first cam movable section 56 is a tabular member. Two cam shaft inserting sections 58, a first cam receiving section 59, a second cam receiving section 60, and a cam receiving section for slide 61 are formed in the first cam movable section 56. The cam shafts 53 of the first prism 31 and the cam convex sections 54 corresponding to the cam shafts 53 are inserted in the cam shaft inserting section 58 on the first prism 31 side. The cam shafts 53 of the second prism 32 and the cam convex sections 54 corresponding to the cam shafts 53 are inserted in the cam shaft inserting section 58 on the second prism 32 side. The cam shaft inserting sections 58 are formed to be cut longer than the length of an arrangement portion of the cam shafts 53 and the cam convex sections 54 such that, in a state in which the cam shafts 53 and the cam convex sections 54 are inserted, the first cam movable section 56 moves in predetermined directions (directions of a double arrow shown in a portion of the first cam movable section 56) with respect to the first rotation supporting section 51.

The cam convex section 55 attached to the first prism 31 is inserted in the first cam receiving section 59. The cam convex section 55 attached to the second prism 32 is inserted in the second cam receiving section 60. The first and second cam receiving sections 59 and 60 are respectively formed to slide the cam convex sections 55.

The first cam receiving section 59 is formed with a longitudinal direction thereof set in an oblique direction with respect to the cam shaft inserting section 58 such that the first prism 31 rotates according to sliding of the cam convex section 55 following the movement of the first cam movable section 56 in the predetermined directions. The second cam receiving section 60 is formed with a longitudinal direction thereof set in an oblique direction with respect to the cam shaft inserting section 58 such that the second prism 32 rotates according to sliding of the cam convex section 55 following the movement of the first cam movable section 56 in the predetermined directions.

The first and second prisms 31 and 32 rotate in association with each other according to the movement of the first cam movable section 56 in the predetermined directions. A rotation amount of the first prism 31 and a rotation amount of the second prism 32 with respect to the movement of the first cam movable section 56 are adjusted by determining, as appropriate, the tilt of the first cam receiving section 59 with respect to the cam shaft inserting section 58 and the tilt of the second cam receiving section 60 with respect to the cam shaft inserting section 58. The first cam movable section 56 and the cam convex section 55 configure a first prism rotation control mechanism for control of a rotation amount for rotating the first prism 31 and a rotation amount for rotating the second prism 32 in association with the first prism 31.

The tilt of the first cam receiving section 59 with respect to the cam shaft inserting section 58 is set larger than the tilt of the second cam receiving section 60 with respect to the cam shaft inserting section 58. This makes it possible to set a rotation amount of the first prism 31 larger than a rotation amount of the second prism 32 with respect to the movement of the first cam movable section 56. In the anamorphic prism optical system 3, since the first prism rotation control mechanism is provided, it is possible to adjust the rotation amounts of the first and second prisms 31 and 32 constituting the first prism set P1 to correspond to a change in an aspect ratio. The shape of the first and second cam receiving sections 59 and 60 can be determined as appropriate according to the rotation amount of the first prism 31 and the rotation amount of the second prism 32. The shape may be either a linear shape or a curved shape.

Like the first cam movable section 56, the second cam movable section 57 is a tabular member. The two cam shaft inserting sections 58, the first cam receiving section 59, the second cam receiving section 60, and the cam receiving section for slide 61 are formed in the second cam movable section 57. The cam shaft 53 of the fourth prism 34 and the cam convex section 54 corresponding to the cam shaft 53 are inserted in the cam shaft inserting section 58 on the fourth prism 34 side. The cam shaft 53 of the third prism 33 and the cam convex section 54 corresponding to the cam shaft 53 are inserted in the cam shaft inserting section 58 on the third prism 33 side. The cam convex section 55 attached to the fourth prism 34 is inserted in the first cam receiving section 59. The cam convex section 55 attached to the third prism 33 is inserted in the second cam receiving section 60. The second cam movable section 57 has structure obtained by reversing the left and the right of the structure of the first cam movable section 56.

The fourth and third prisms 34 and 33 rotate in association with each other according to movement of the second cam movable section 57 in predetermined directions (directions of a double arrow shown in a portion of the second cam movable section 57 in the figure). A rotation amount of the fourth prism 34 and a rotation amount of the third prism 33 with respect to the movement of the second cam movable section 57 are adjusted by determining, as appropriate, the tilt of the first cam receiving section 59 with respect to the cam shaft inserting section 58 and the tilt of the second cam receiving section 60 with respect to the cam shaft inserting section 58. The second cam movable section 57 and the cam convex section 55 configure a second prism rotation control mechanism for control of a rotation amount for rotating the fourth prism 34 and a rotation amount for rotating the third prism 33 in association with the fourth prism 34.

The tilt of the first cam receiving section 59 with respect to the cam shaft inserting section 58 is set larger than the tilt of the second cam receiving section 60 with respect to the cam shaft inserting section 58. This makes it possible to set a rotation amount of the fourth prism 34 larger than a rotation amount of the third prism 33 with respect to the movement of the second cam movable section 57. In the anamorphic prism optical system 3, since the second prism rotation control mechanism is provided, it is possible to adjust the rotation amounts of the fourth and third prisms 34 and 33 constituting the second prism set P2 to correspond to a change in an aspect ratio. The shape of the first and second cam receiving sections 59 and 60 can be determined as appropriate according to the rotation amount of the fourth prism 34 and the rotation amount of the third prism 33. The shape may be either a linear shape or a curved shape.

Figure 19:
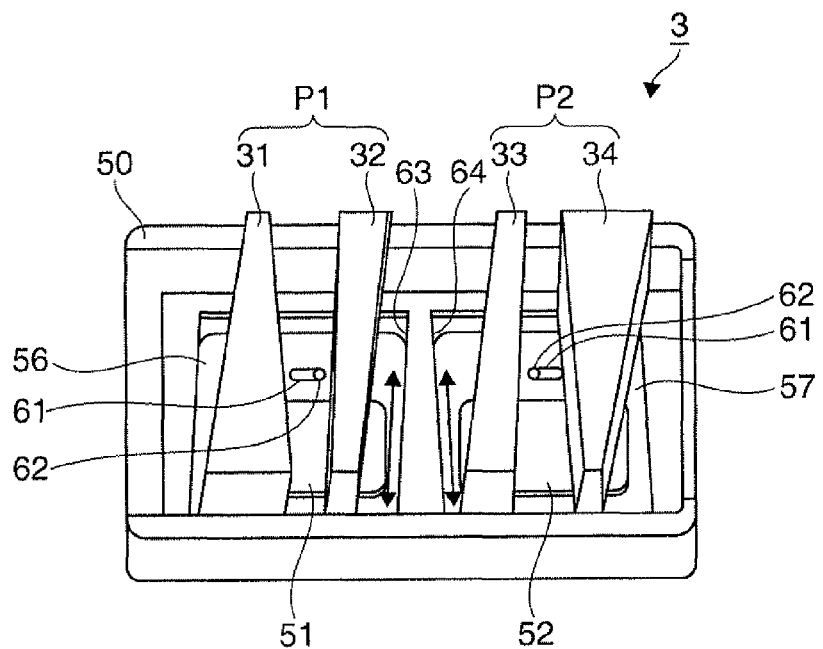
FIG. 19 is a perspective view of the anamorphic prism optical system viewed from the opposite side of a side covered with a case.
Figure 20:
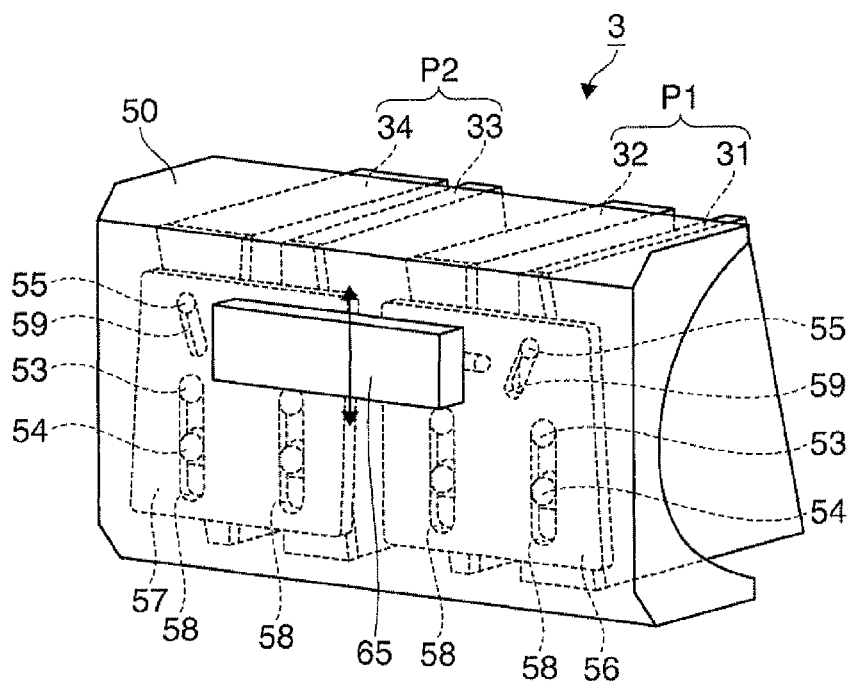
FIG. 20 is a transparent perspective view of the anamorphic prism optical system viewed from the side covered with the case.

FIG. 19 is a perspective view of the anamorphic prism optical system 3 viewed from the opposite side of the side covered with the case 50. FIG. 20 is a transparent perspective view of the anamorphic prism optical system 3 viewed from the side covered with the case 50. The first cam movable section 56 is arranged to be fit in a first groove section 63 formed on the inner surface of the case 50. The first groove section 63 is formed larger than the first cam movable section 56 in predetermined directions (directions of a double arrow shown in a portion of the first cam movable section 56 in the figure) to slide the first cam movable section 56 in the predetermined directions.

The second cam movable section 57 is arranged to be fit in a second groove section 64 formed on the inner surface of the case 50. The second groove section 64 is formed larger than the second cam movable section 57 in predetermined directions (directions of a double arrow shown in a portion of the second cam movable section 57 in the figure) to slide the second cam movable section 57 in the predetermined directions. The first and second groove sections 63 and 64 are formed to be tilted with respect to each other such that a space between the first and second cam movable sections 56 and 57 gradually changes according to the sliding of the first and second movable sections 56 and 57.

The space between the first and second prism sets P1 and P2 is adjusted according to a change in the space between the first and second cam movable sections 56 and 57. The first cam movable section 56 moves the first prism set P1 in association with the rotation of the first and second prisms 31 and 32. The second cam movable section 57 moves the second prism set P2 in association with the rotation of the fourth and third prisms 34 and 33. The first cam movable section 56, the first groove section 63, the second cam movable section 57, and the second groove section 64 function as a prism set space adjusting mechanism for adjusting the space between the first and second prism sets P1 and P2. In the anamorphic prism optical system 3, since the prism set space adjusting mechanism is provided, it is possible to adjust the space between the first and second prism sets P1 and P2 to correspond to a change in an aspect ratio.

A slider 65 is attached on the opposite side of the side on which the prisms 31, 32, 33, and 34 are arranged in the case 50. The slider 65 includes two cam convex sections for slide 62 projected to the side on which the prisms 31, 32, 33, and 34 are arranged in the case 50. One of the cam convex sections for slide 62 is inserted in a cam receiving section for slide 61 of the first cam movable section 56. The other of the cam convex sections for slide 62 is inserted in the cam receiving section for slide 61 of the second cam movable section 57.

The slider 65 is moved in predetermined directions (both arrow directions shown in FIG. 20) to thereby move the first and second cam movable sections 56 and 57 via the cam convex sections for slide 62. The slider 65 functions as an operation section for simultaneously moving the first and second cam movable sections 56 and 57. The cam receiving sections for slide 61 are formed to slide the cam convex sections for slide 62 in a direction substantially perpendicular to the directions in which the slider 65 is moved. Consequently, the first and second cam movable sections 56 and 57 are moved such that the space between the first and second cam movable sections 56 and 57 changes according to the movement of the slider 65.

The anamorphic prism optical system 3 can collectively control the rotation amounts of the prisms 31, 32, 33, and 34 and the space between the first and second prism sets P1 and P2 according to the operation of the slider 65. With the configuration explained above, the anamorphic prism optical system 3 causes the prisms 31, 32, 33, and 34 to operate in association with one another with rotation amounts and spaces set in advance.

The structure of a cam mechanism for causing the prisms 31, 32, 33, and 34 to operate may be modified as appropriate. A mechanism for causing the prisms 31, 32, 33, and 34 to operate may be a mechanism other than the cam mechanism. The anamorphic prism optical system 3 may control the rotation amounts and the spaces of the prisms 31, 32, 33, and 34 using positioning driving means such as a stepping motor. Concerning members forming the prisms 31, 32, 33, and 34, it is required that the refractive index of the member forming the first prism 31 is different from the refractive index of the member forming the second prism 32 and that the refractive index of the member forming the third prism 33 is different from the refractive index of the member forming the fourth prism 34. The members may be changed as appropriate.

Second Embodiment

Figure 21:
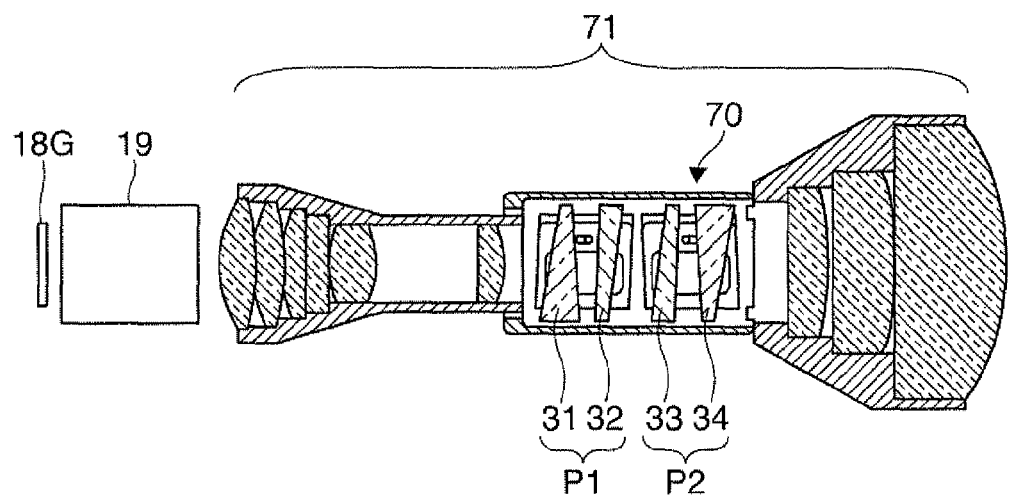
FIG. 21 is a diagram showing a configuration including an anamorphic prism optical system according to a second embodiment.

FIG. 21 is a diagram showing a part of a configuration including an anamorphic prism optical system 70 in a projector according to a second embodiment of the invention. In this embodiment, the anamorphic prism optical system 70 is incorporated in a projection optical system 71. Components same as those in the first embodiment are denoted by the same reference numerals and signs and redundant explanation of the components is omitted. In the figure, the anamorphic prism optical system 70 is represented by a section, and the projection optical system 71 is represented by a section. The anamorphic prism optical system 70 is arranged between optical elements configuring the projection optical system 71.

In the position where the anamorphic prism optical system 70 is arranged, the projection optical system 71 passes light (collimate light), a principal ray and peripheral rays of which are substantially parallel, concerning a beam from any of image heights. In this embodiment, as in the first embodiment, it is possible to obtain a satisfactory video image without causing a large angle error by making the collimate light incident on the anamorphic prism optical system 70.

The projection optical system 71 makes a principal ray and peripheral rays of a light beam substantially parallel, for example, in the vicinity of a stop. It is possible to make the collimate light incident on the anamorphic prism optical system 70 by arranging the anamorphic prism optical system 70 in the vicinity of the stop. In this embodiment, the vicinity of the stop includes a position before the stop, a position behind the stop, and positions across the stop. To cause the projection optical system 71 to efficiently emit light having a converted aspect ratio, the anamorphic prism optical system 70 is desirably arranged in a position where the light after passing through the stop is made incident.

In this embodiment, the anamorphic prism optical system 70 is arranged in a portion where a light beam converges compared with the emission side of the projection optical system 71. Therefore, the anamorphic prism optical system 70 can be reduced in size. In addition, since the anamorphic prism optical system 70 is integrated with (incorporated in) the projection optical system 71, it is possible to realize a reduction in size of the projector.

Third Embodiment

Figure 22:
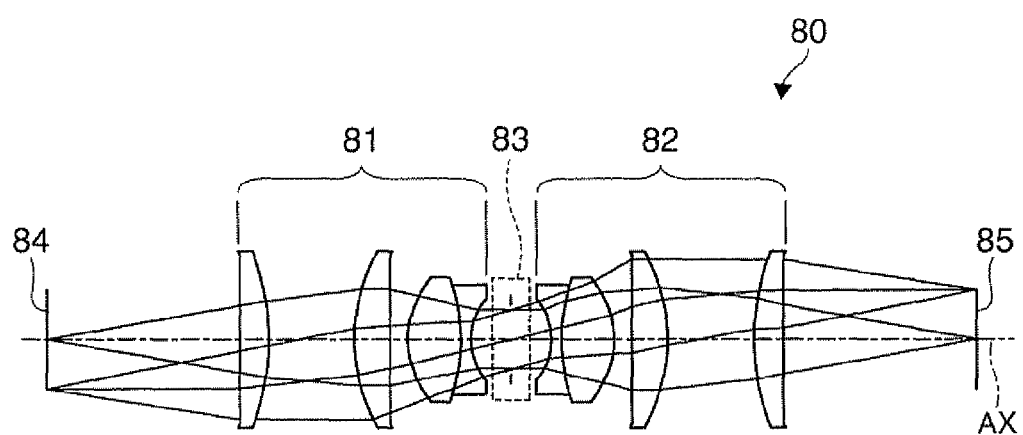
FIG. 22 is a diagram showing a configuration including an anamorphic prism optical system according to a third embodiment.

FIG. 22 is a diagram showing a part of a configuration including an anamorphic prism optical system in a projector according to a third embodiment of the invention. In this embodiment, the projector includes a relay optical system 80 including an anamorphic prism optical system 83. Redundant explanation of the embodiments explained above is omitted. The relay optical system 80 includes a first optical system 81, an anamorphic prism optical system 83, and a second optical system 82.

The relay optical system 80 is provided in an optical path between an image surface 84 imaginarily formed on emission surfaces of the liquid crystal display panels 18R, 18G, and 18B and a projection optical system (not shown). The first optical system 81 makes video light converted into collimate light incident on the anamorphic prism optical system 83. The second optical system 82 makes the video light emitted from the anamorphic prism optical system 83 incident on the projection optical system.

The second optical system 82 images an intermediate image 85 with the collimated light, an aspect ratio of which is converted in the anamorphic prism optical system 83. The first and second optical systems 81 and 82 constitute a double-sided telecentric optical system. The relay optical system 80 functions as the double-sided telecentric optical system that can convert an aspect ratio. This makes it possible to continuously change an aspect ratio of the intermediate image 85. In this embodiment, it is possible to reduce the back focus of the projection optical system to substantially zero and realize improvement of performance and a reduction in size of the projection optical system.

Fourth Embodiment

Figure 23:
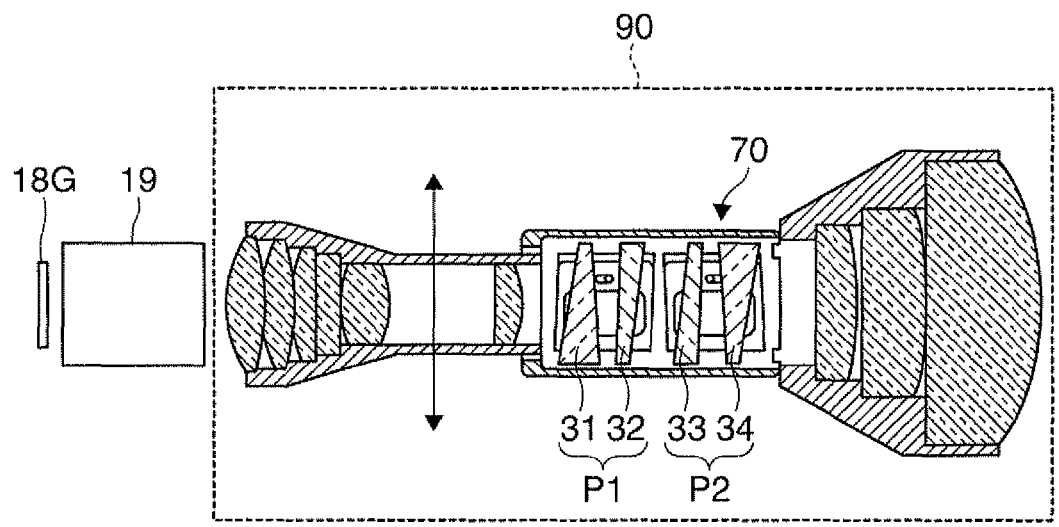
FIG. 23 is a diagram showing a configuration including an anamorphic prism optical system according to a fourth embodiment.

FIG. 23 is a diagram showing a part of a configuration including the anamorphic prism optical system 70 in a projector according to a fourth embodiment of the invention. In this embodiment, a projection optical system 90 is movable in a direction in which light beam width is converted according to conversion of an aspect ratio. Components same as those in the first and second embodiments are denoted by the same reference numerals and signs and redundant explanation of the components is omitted. In this embodiment, the anamorphic prism optical system 70 is incorporated in the projection optical system 90. The projector includes a moving mechanism (not shown) that moves the projection optical system 90 in directions indicated by a double arrow in the figure.

Figure 24:
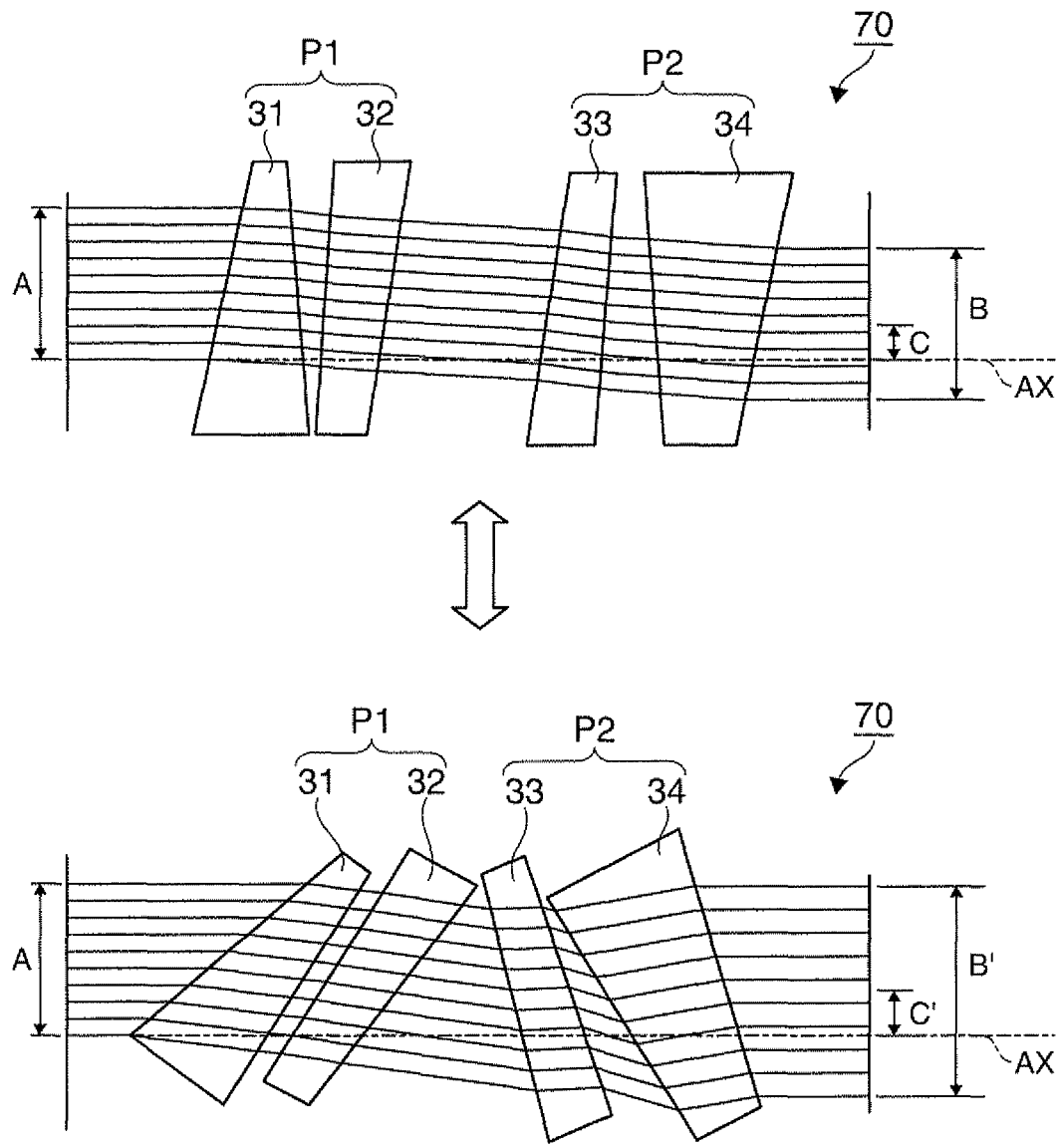
FIG. 24 is a diagram for explaining a direction in which a projection optical system is moved.

FIG. 24 is a diagram for explaining the directions in which the projection optical system 90 is moved. In the upper part of the figure, the anamorphic prism optical system 70 and rays in a state in which a magnification is set to 1.0 are shown. In the lower part of the figure, the anamorphic prism optical system 70 and rays in a state in which a magnification is set to 1.30 are shown. A distance between a center position C' of a light beam and the optical axis AX at the time when the magnification is 1.30 is slightly reduced from a distance between a center position C and the optical axis AX at the time when the magnification is 1.0. In this case, the projection optical system 90 is moved to move the center position C' at the time of the magnification of 1.30 in a direction away from the optical axis AX (the upward direction in the figure). The projection optical system 90 is moved in a direction opposite to a direction in which an irradiation region moves according to conversion of an aspect ratio. The movement of the projection optical system 90 may be any of movement by manual adjustment and movement by automatic adjustment associated with the aspect ratio conversion.

In this way, the projection optical system 90 is moved to offset the movement of the irradiation region according to conversion of the aspect ratio. This makes it possible to realize an optical system with which the position of the irradiation region is fixed even if the aspect ratio is converted. In this embodiment, the projection optical system may be moved in a configuration in which the anamorphic prism optical system is arranged on the side of the surface to be irradiated with respect to the projection optical system (see, for example, the first embodiment) or a configuration in which the anamorphic prism optical system is arranged between the surface to be irradiated and the projection optical system (see, for example, the third embodiment). The anamorphic prism optical systems (anamorphic prism optical units) according to the embodiments are not limited to the optical system of the projector. The anamorphic prism optical systems may be applied to other optical systems such as an imaging optical system.

The entire disclosure of Japanese Patent Application No. 2010-028622, filed Feb. 12, 2010 is expressly incorporated by reference herein.

What is claimed is:

1. A projector comprising:
a projection optical system that projects video light; and
an anamorphic prism optical system for converting an aspect ratio of an irradiation region on which the video light is irradiated, wherein
the anamorphic prism optical system includes:
a first prism set obtained by combining a first prism and a second prism on which the video light emitted from the first prism is made incident; and
a second prism set obtained by combining a third prism on which the video light emitted from the second prism is made incident and a fourth prism on which the video light emitted from the third prism is made incident,
the first prism, the second prism, the third prism, and the fourth prism each have an individual rotation axis respectively, rotation amounts of the first prism, the second prism, the third prism, and the fourth prism are respectively adjusted by operations independent from each other, and
a space between the first and second prism sets is adjustable in association with the rotation of the first prism, the second prism, the third prism, and the fourth prism.

2. The projector according to claim 1, further comprising:
a first rotation supporting section that rotatably supports the first and second prisms; and
a second rotation supporting section that rotatably supports the third and fourth prisms.

3. The projector according to claim 2, further comprising:
a first prism rotation control mechanism for control of a rotation amount for rotating the first prism and a rotation amount for rotating the second prism in association with the first prism; and
a second prism rotation control mechanism for control of a rotation amount for rotating the fourth prism and a rotation amount for rotating the third prism in association with the fourth prism.

4. The projector according to claim 3, further comprising a prism set space adjusting mechanism for adjusting the space between the first and second prism sets by moving the first prism set in association with the rotation of the first and second prisms and moving the second prism set in association with the rotation of the third and fourth prisms.

5. The projector according to claim 3, further comprising:
a first cam movable section movable with respect to the first rotation supporting section and configuring the first prism rotation control mechanism;
a second cam movable section movable with respect to the second rotation supporting section and configuring the second prism rotation control mechanism; and
a cam convex section attached to the first prism, a cam convex section attached to the second prism, a cam convex section attached to the third prism, and a cam convex section attached to the fourth prism, wherein
the first cam movable section includes:
a first cam receiving section formed to be capable of sliding the cam convex section attached to the first prism; and
a second cam receiving section formed to be capable of sliding the cam convex section attached to the second prism, and
the second cam movable section includes:
a first cam receiving section formed to be capable of sliding the cam convex section attached to the fourth prism; and
a second cam receiving section formed to be capable of sliding the cam convex section attached to the third prism.

6. The projector according to claim 5, wherein the first and second cam movable sections configure the prism set space adjusting mechanism.

7. The projector according to claim 6, further comprising an operation section for simultaneously moving the first and second cam movable sections.

8. The projector according to claim 1, wherein
the first and second prisms are formed of members having refractive indexes different from each other, and
the third and fourth prisms are formed of members having refractive indexes different from each other.

9. The projector according to claim 8, wherein
the second prism is formed of the member having a refractive index higher than that of the member forming the first prism, and
the third prism is formed of the member having a refractive index higher than that of the member forming the fourth prism.

10. The projector according to claim 9, wherein
the first and fourth prisms are formed of a same material,
the second and third prisms are formed of a same material,
a shape of the first prism has an apical angle in a predetermined plane,
a shape of the second prism has an apical angle in a predetermined plane,
a shape of the third prism has an apical angle in a predetermined plane, and
a shape of the fourth prism has an apical angle in a predetermined plane, wherein
the apical angle of the shape of the first prism is the same as the apical angle of the shape of the fourth prism, and
the apical angle of the shape of the second prism is the same as the apical angle of the shape of the third prism.

11. The projector according to claim 10, wherein
the shape of the first prism is the same as the shape of the fourth prism, and the shape of the second prism is the same as the shape of the third prism.

12. The projector according to claim 10, wherein
an angle formed by a normal of an incident surface of the first prism on which the video light is made incident and an incident ray is equal to an absolute value of an angle formed by a normal of an incident surface of the fourth prism on which the video light is made incident and the incident ray, and
an angle formed by a normal of an incident surface of the second prism on which the video light is made incident and an incident ray is equal to an absolute value of an angle formed by a normal of an incident surface of the third prism on which the video light is made incident and the incident ray.

13. The projector according to claim 1, wherein the anamorphic prism optical system is provided in a position where the video light emitted from the projection optical system is made incident.

14. The projector according to claim 1, wherein the anamorphic prism optical system is arranged between optical elements constituting the projection optical system.

15. The projector according to claim 14, wherein the anamorphic prism optical system is arranged in a vicinity of a stop of the projection optical system.

16. The projector according to claim 1, further comprising:
a first optical system that makes the video light converted into collimate light incident on the anamorphic prism optical system; and
a second optical system that makes the video light emitted from the anamorphic prism optical system incident on the projection optical system, wherein
the second optical system images an intermediate image.

17. The projector according to claim 1, wherein the projection optical system is movable in a direction in which light beam width is changed according to conversion of the aspect ratio.

18. An anamorphic prism optical system for converting an aspect ratio of an irradiation region on which a video light is irradiated, the anamorphic prism optical system comprising:
a first prism set obtained by combining a first prism and a second prism on which the video light emitted from the first prism is made incident; and
a second prism set obtained by combining a third prism on which the video light emitted from the second prism is made incident and a fourth prism on which the video light emitted from the third prism is made incident, wherein
the first prism, the second prism, the third prism, and the fourth prism each have an individual rotation axis respectively, rotation amounts of the first prism, the second prism, the third prism, and the fourth prism are respectively adjusted by operations independent from each other, and
a space between the first and second prism sets is adjustable in association with the rotation of the first prism, the second prism, the third prism, and the fourth prism.

* * * * *